United States Patent [19]

Nakazawa et al.

[11] Patent Number: 5,465,352
[45] Date of Patent: Nov. 7, 1995

[54] TABLE-AND-CACHE-BASED DATABASE ASSIST METHOD

[75] Inventors: Takayuki Nakazawa; Takafumi Okizuka; Nobuyuki Takebe; Jinshi Annen, all of Kawasaki, Japan

[73] Assignee: Fujitsu Limited, Kawasaki, Japan

[21] Appl. No.: 19,882

[22] Filed: Feb. 19, 1993

[30] Foreign Application Priority Data

Feb. 20, 1992 [JP] Japan .................................. 4-032403

[51] Int. Cl.⁶ .................................................. G06F 17/30
[52] U.S. Cl. ..................... 395/600; 395/700; 395/650; 364/974; 364/974.6; 364/974.4; 364/283.4; 364/DIG. 2; 364/DIG. 1
[58] Field of Search ..................... 395/600, 700, 395/650

[56] References Cited

U.S. PATENT DOCUMENTS

| | | | |
|---|---|---|---|
| 5,091,852 | 2/1992 | Tsuchida et al. | 395/600 |
| 5,317,727 | 5/1994 | Tsuchida et al. | 395/600 |
| 5,317,731 | 5/1994 | Dias et al. | 395/600 |

FOREIGN PATENT DOCUMENTS

| | | |
|---|---|---|
| 2-238568 | 9/1990 | Japan . |
| 4-123265 | 4/1992 | Japan . |

OTHER PUBLICATIONS

Nancy C. Ramsey, "Integration of the Optical Storage Processor and the DBC/1012 Database Computer", *Digest of Papers. Tenth IEEE Symposium on Mass Storage Systems. Crisis in Mass Storage*, IEEE Computer Society Press, 7–10 May 1990, pp. 94–100.

Robert D. Sloan, "A Practical Implementation of the Data Base Machine–Terradata DBC/1012", *Proceedings of the Twenty–Fifth Hawaii International Conference on System Sciences*, IEEE Computer Society Press, 1991, pp. 320–326.

*Primary Examiner*—Thomas G. Black
*Assistant Examiner*—Paul R. Lintz
*Attorney, Agent, or Firm*—Staas & Halsey

[57] ABSTRACT

A database assist method is adapted to a data processing system which includes a first processing unit, an input/output unit which is coupled to the first processing unit, a second processing unit, a database and cache memory. The database assist method assists a database related process which includes selection of items from records stored in the database and includes the steps of (a) forming an execution procedure table which defines a procedure for retrieving information of interest from the database in response to a processing request from a request source, (b) generating at least a column information table which defines item structures within the records and a selection/projection table which defines the items to be extracted and extracting conditions based on the execution procedure table, (c) storing a block group of interest into cache memory from the database based on the column information table and the selection/projection table and carrying out a specified process with respect to the stored block group for a specified item, and (d) returning a result of the specified process carried out in step (c) to the request source by a batch processing.

10 Claims, 13 Drawing Sheets

FIG. 8

| RETURNING DATA | MEANING |
|---|---|
| NO. OF RECORDS | NO. OF RECORDS SUBJECT TO AGGREGATE IS RETURNED |
| TOTAL OF ITEM VALUES | TOTAL OF VALUES OF ITEMS EXCLUDING NULL VALUE & NO. OF CASES ARE RETURNED FOR EACH ITEM |
| NO. (OF CASES) OF ITEM VALUES | |

FIG. 9

| SET FUNCTION | DATABASE ASSIST FUNCTION | CONTENTS OF RESET FUNCTION |
|---|---|---|
| SUM | YES | TOTAL RESULTS OF TOTALS OF ITEM VALUES |
| AVG | YES | OBTAIN AVERAGE FROM TOTAL OF ITEM VALUES & TOTAL OF NO. OF CASES |
| MAX | NO | — |
| MIN | NO | — |
| COUNT (ITEM) | YES | TOTAL OF NO. OF ITEM VALUES |
| COUNT (*) | YES | TOTAL OF NO. OF RECORDS |

FIG. 10

| CONDITION FORMULA | ITEM OPERATOR CONSTANT | "LIKE" PREDICATE | "IN" PREDICATE |
|---|---|---|---|

TABLE-AND-CACHE-BASED DATABASE ASSIST METHOD

BACKGROUND OF THE INVENTION

The present invention generally relates to database assist methods, and more particularly to a database assist method which carries out a process such as selecting an item of a record in a database.

Typical functions of a relational database include selection, projection, join, aggregate, grouping and sorting. In order to realize such functions, a relational database manager reads the records stored in the database into a memory of a host computer before processing the records. If all of the records stored in the database are read into the memory of the host unit and the processing is carried out one record at a time, an extremely large load is applied to a central processor and a channel processor of the host computer.

In order to prevent the extremely large load from being applied to the processors of the host computer, there is a conventional relational database processing technique which uses indexes as shown in FIG. 1. By employing this technique which uses the indexes, it becomes possible to determine specific records and to read only the specific records from the database into the memory of the host computer in order to process the specific records. As a result, the number of records which need to be read from the database into the memory of the host computer is reduced, and the load on the processors of the host computer is reduced.

Next, a description will be given of the conventional relational database processing technique which uses the indexes. In FIG. 1, indexes A, B, C, D and E are set with respect to different items. Each index points to a corresponding record of the relational database as indicated by an arrow.

The relational database is made up of a group of records in which the contents of a plurality of items are set. For example, the items include an employee number, name, position name, birth date and the like. When retrieving the item such as the employee number, for example, a reference is made to a corresponding index of this item out of the indexes A, B, C, D and E, and the corresponding record of the relational database is read. The read record is subjected to a processing such as a sorting in an ascending order, and is output thereafter.

However, according to the conventional relational database processing technique described above, the index must be set for a plurality of items and stored in the case of a work which makes various retrievals with respect to the same table. For this reason, the following problems occur.

First, there is a problem in that it takes considerable time to make the indexes for the large number of items.

Second, there is a problem in that the index must be updated if a line of the relational database is updated, and the processing time of the updating system becomes long.

Third, there is a problem in that it takes considerable time and effort to design and manage the definitions of the indexes.

SUMMARY OF THE INVENTION

Accordingly, it is a general object of the present invention to provide a novel and useful database assist method in which the problems described above are eliminated.

Another and more specific object of the present invention is to provide a database assist method adapted to a data processing system which includes a first processing unit and an input/output unit which is coupled to the first processing unit and includes a second processing unit, a database and cache memory means, where the database assist method assists a database related process which includes selection of items from records stored in the database and comprises the steps of (a) forming an execution procedure table which defines a procedure for retrieving information of interest from the database in response to a processing request from a request source, (b) generating at least a column information table and a selection/projection table based on the execution procedure table, the column information table defining item structures within the records, the selection/projection table defining the items to be extracted and extracting conditions, (c) storing a block group of interest into cache memory means from the database based on the column information table and the selection/projection table and carrying out a specified process with respect to the stored block group for a specified item, and (d) returning a result of the specified process carried out in the step (c) to the request source by a batch processing. According to the database assist method of the present invention, it is possible to considerably reduce the amount of data which needs to be input to the first processing unit (for example, a host CPU) via the second processing unit (for example, a channel processor) and accordingly reduce the load of a part of the process which is carried out by the first processing unit. Furthermore, it is possible to simplify the indexes and carry out the updating of the database at a high speed. On the other hand, by employing a database assist which is formed by the second processing unit, the information (column information table and selection/projection table) for using the hardware becomes independent of the definition information of the database. For this reason, it is possible to introduce the database assist asynchronously with the making of the database. In addition, even if the database assist is unavailable for some reason, it is possible to automatically enter the record of interest from the database in accordance with the execution procedure table and continue the database related process.

Other objects and further features of the present invention will be apparent from the following detailed description when read in conjunction with the accompanying drawings.

BRIEF DESCRIPTION OF THE DRAWINGS

FIG. 8 shows an embodiment of an aggregate of a database assist;

FIG. 9 shows an embodiment of a utilization range of the database assist and reaggregate of returned information;

FIG. 10 shows an embodiment of a condition formula which carries out a process by the database assist;

DESCRIPTION OF THE PREFERRED EMBODIMENTS

Figure 1:
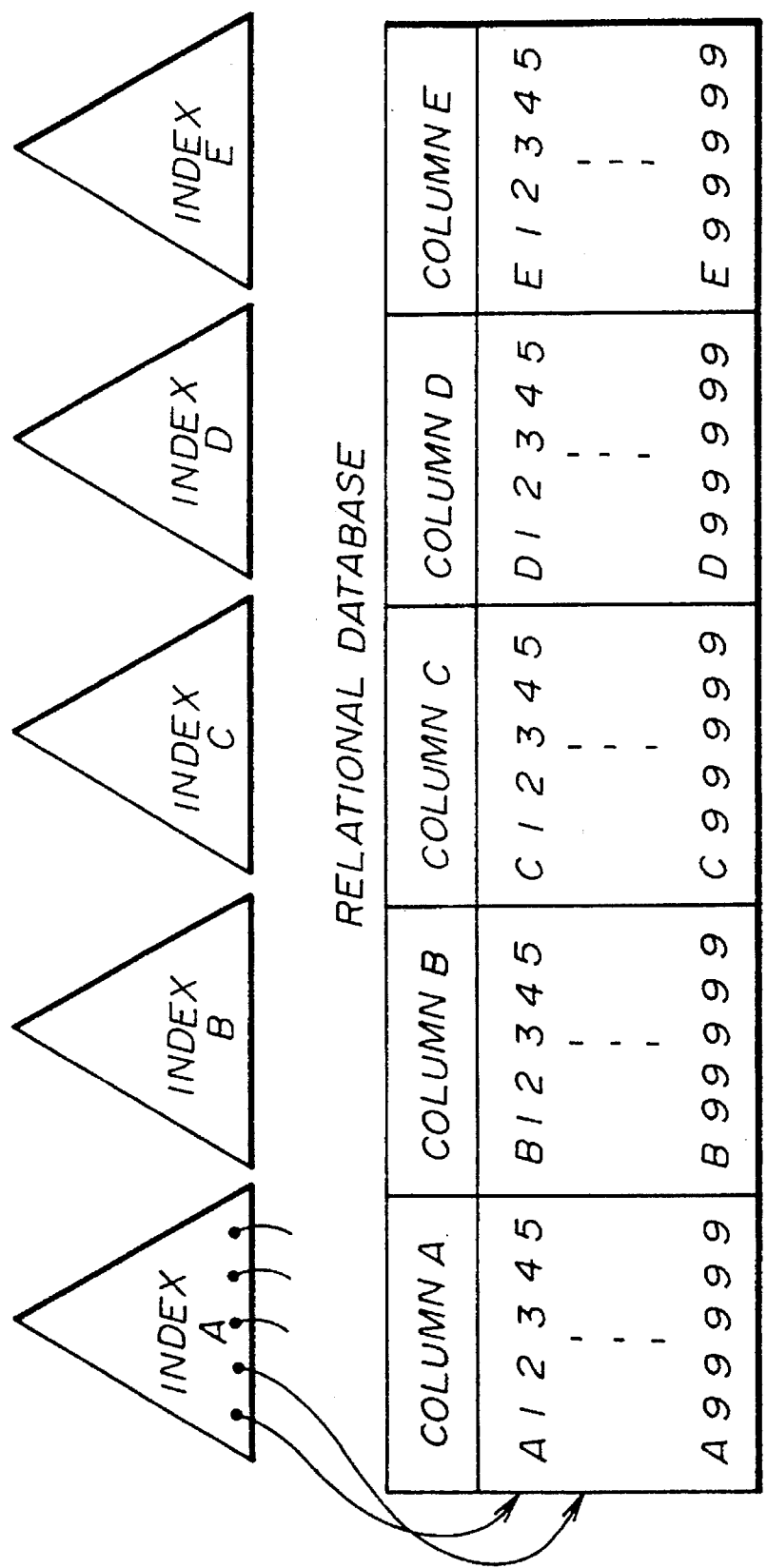
FIG. 1 is a diagram for explaining a conventional relational database processing technique which uses indexes.
Figure 2:
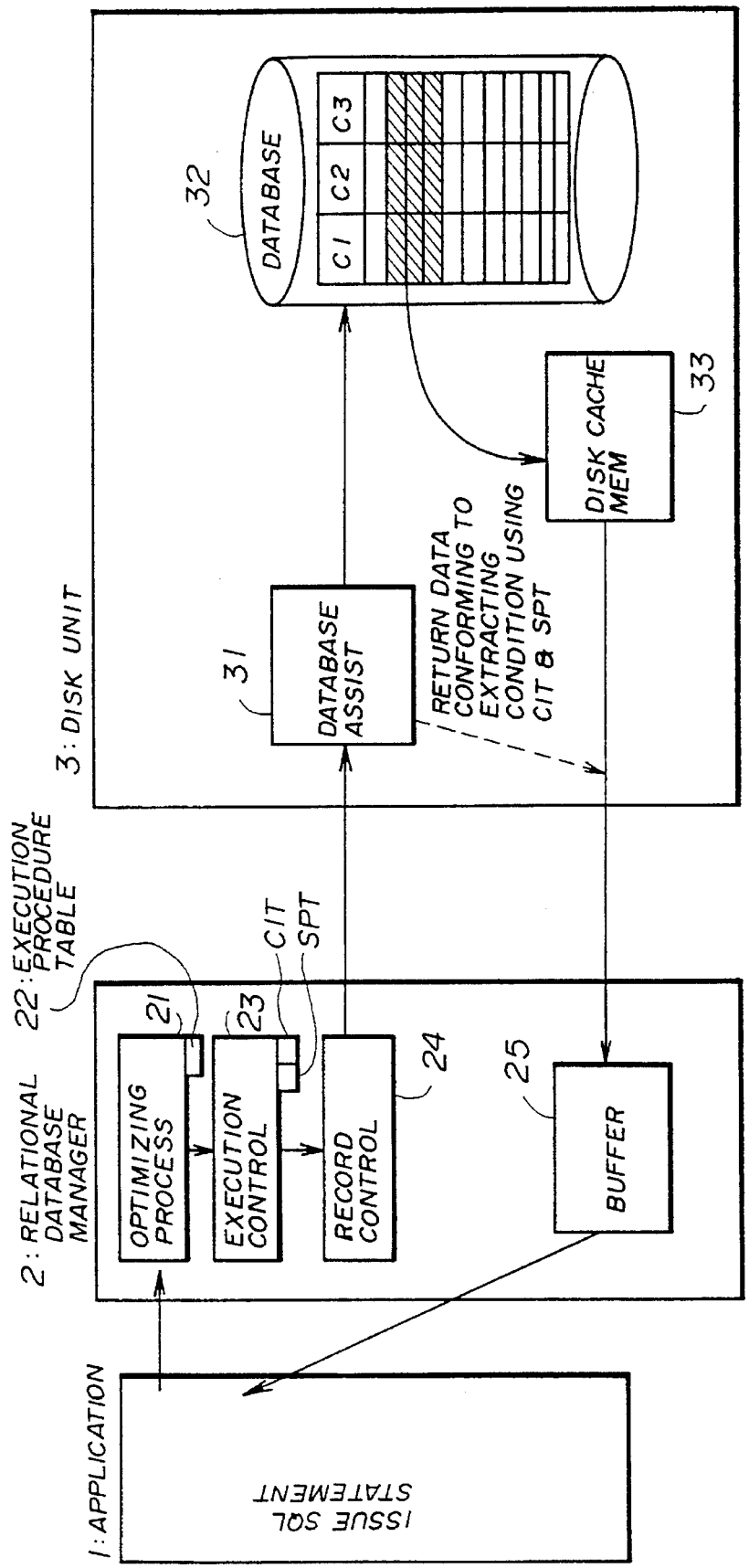
FIG. 2 is a system block diagram for explaining a first embodiment of a database assist method according to the present invention.

FIG. 2 is a system block diagram for explaining a first embodiment of a database assist method according to the present invention. In FIG. 2, an application 1 is an application program or a work program which carries out various processes by making an access to a relational database 32. This application 1 makes a processing request using a SQL statement which is a database access language statement, as will be described later in conjunction with a step S1 shown in FIG. 3 and a step S21 shown in FIG. 7.

A relational database manager 2 accepts a database processing request from the application 1 in the SQL. In other words, the application 1 is the source of the database processing request. The relational database manager 2 forms an execution procedure table by analyzing this database processing request, and further forms a column (item) information table CIT and a selection/projection information table SPT. In addition, the relational database manager 2 makes a request to a database assist 31 so as to make a selection/projection with respect to the database 32 and to receive processed results of the aggregate. A further processing such as the aggregate and the sorting is carried out by the relational database manager 2 if necessary. The processed result is returned from the relational database manager 2 to the application 1.

In this embodiment, the relational database manager 2 includes an optimizing process 21, an execution control 23, a record control 24, and a buffer 25.

The optimizing process 21 forms an execution procedure table 22 in correspondence with the processing request from the application 1. The functional structure of the relational database manager 2 includes a dictionary which stores definition information related to the existence of the indexes, the length of the records and the like, and statistical information related to the number of records stored in the actual database, the number of pages used and the like. Accordingly, the optimizing process 21 makes a reference to this dictionary based on the SQL statement, and forms the execution table 22 shown in FIG. 4 by judging whether or not there exists a path which can use the index for the retrieval condition which is written in the SQL statement.

As will be described later, the execution procedure table 22 shown in FIG. 4 sets, that is, defines, the procedure for retrieving the information of interest from the database 32 based on the SQL statement.

The execution control 23 generates the column information table CIT which defines the item structures within the records, and the selection/projection table SPT which defines the items to be extracted (that is, extracting items) and the extracting conditions. The execution control 23 carries out a process such as extracting the item of interest from the record. The processed result is returned to the application 1 from the execution control 23.

In addition, if the database assist 31 is not loaded or an error response is received when a process is instructed to the database assist 31 and the database assist 31 is not available (that is, cannot be utilized), the execution control 23 enters the record of interest from the database 32 in accordance with the execution procedure table 22 and continues the processing.

The record control 24 notifies the column information table CIT and the selection/projection table SPT to the database assist 31 in correspondence with the access request from the execution control 23, and also makes a process request or the like.

The buffer 25 stores the processed result or the like from the database assist 31.

A disk unit 3 stores the database 32, and is used as an external storage unit for carrying out a process such as selecting an arbitrary item. In this embodiment, the disk unit 3 includes the database assist 31, the database 32, a disk cache memory 33 and the like.

The database assist 31 stores the block group of the database 32 into the disk cache memory 33 in correspondence with the processing request, and carries out a specified process for a specified item. For example, the specified process is selection, projection, aggregate and the like. The processed result is returned to the relational database manager 2 from the database assist 31 by a batch processing.

The database 32 is formed by a disk storage which stores the records by setting the contents of the items therein.

The disk cache memory 33 stores a part of the records of the database 32, and returns the records to the access source when hit, so as to enable a high-speed access to the database 32. In this embodiment, the disk cache memory 33 is used to store the block group which is obtained from the database 32.

In FIG. 2, the application 1 and the relational database manager 2 are provided in a host central processing unit (CPU) of a data processing system. On the other hand, the disk unit 3 forms an input/output unit which is coupled to the host CPU, and a CPU of the input/output unit forms the database assist 31. Hence, the cache disk memory 33 is a part of the input/output unit.

Next, a more detailed description will be given of the operation of this embodiment, by first referring to FIG. 3 which shows the selection/projection of the database 32.

Figure 3:
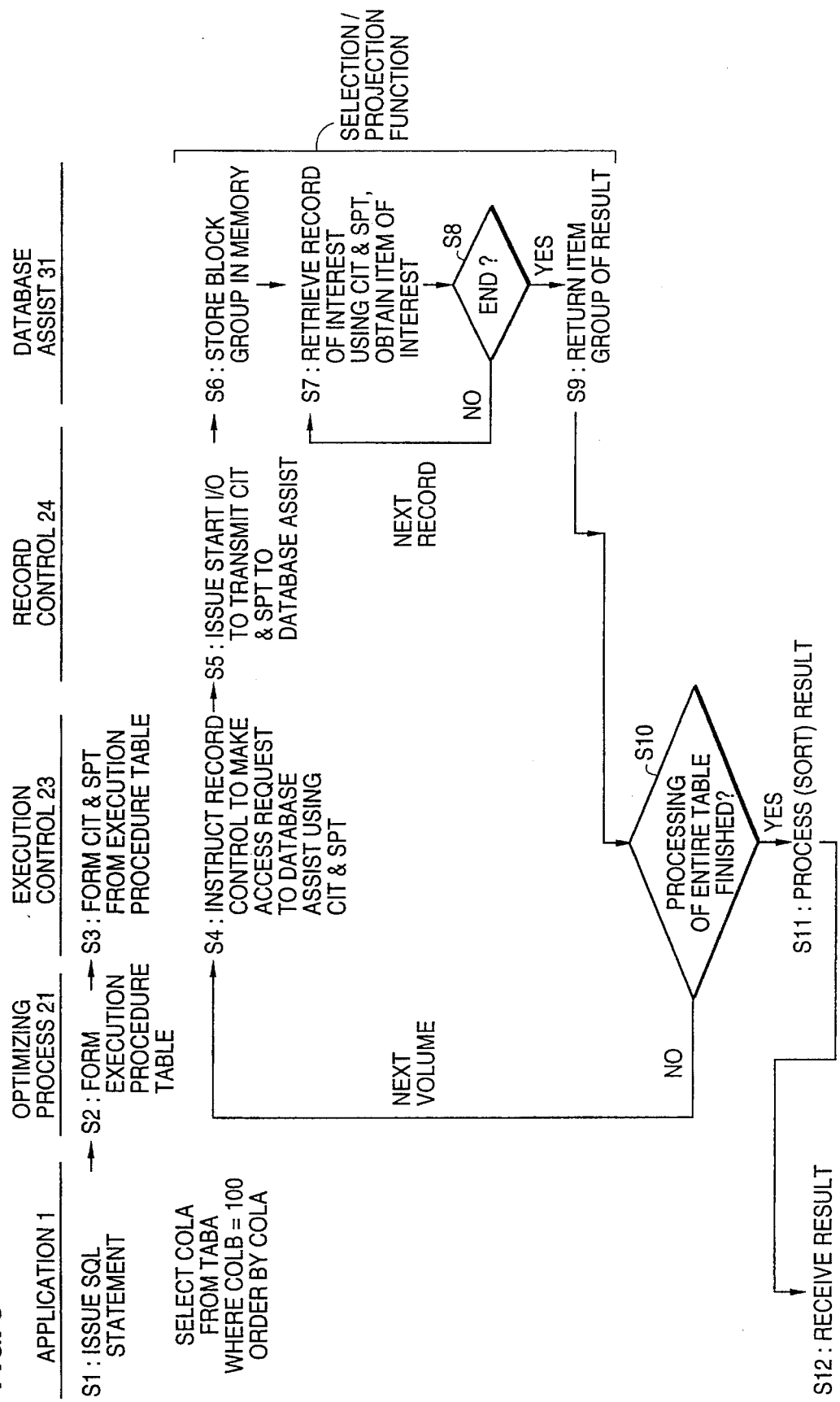
FIG. 3 is a flow chart for explaining selection/projection of a database in the first embodiment.

In FIG. 3, the application 1 issues a SQL statement in a step S2 and requests selection/projection of the database 32. For example, the following SQL statement is issued to make the processing request to the database 32.

SELECT COLA FROM TABA
WHERE COLB=100
ORDER BY COLA

In the SQL statement above, "SELECT COLA FROM TABA" means "select and output the items COLA from the record in the table TABA". "WHERE COLB=100" means "the key value of the item COLB is 100". In addition, "ORDER BY COLA" means "sort by the item COLA".

Therefore, the SQL statement issued by the application 1 in this case requests that the item COLB is used as the key, the record having the key value 100 is retrieved from the table TABA, the items COLA are output from the retrieved record, and the output items COLA are sorted and returned.

The optimizing process 21 forms the execution procedure table in a step S2 based on the SQL statement. In this embodiment, the step S2 analyzes the SQL statement and forms the execution procedure table 22 shown in FIG. 4 (A). In this case, [1] the table TABA is retrieved using the item COLB as the key, and the key value of the item COLB is 100. In addition, [2] the retrieval is repeated until the retrieval result is no longer obtained, and the items COLA are output from the record of the table TABA.

Figure 4A:
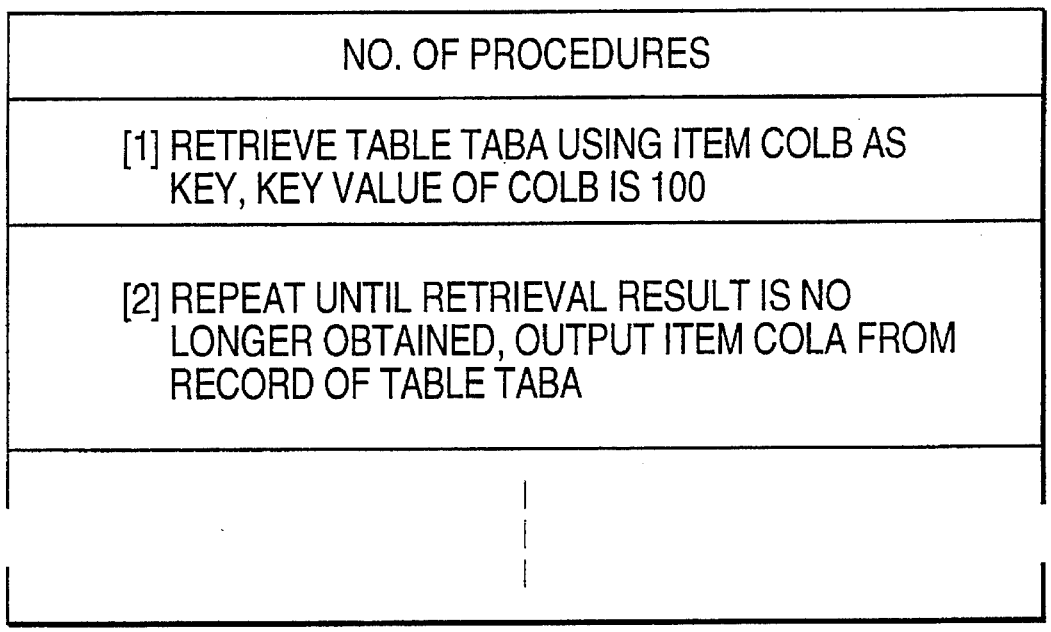
FIG. 4 is a composite of parts (A) and (B) of an execution procedure table.
Figure 4B:
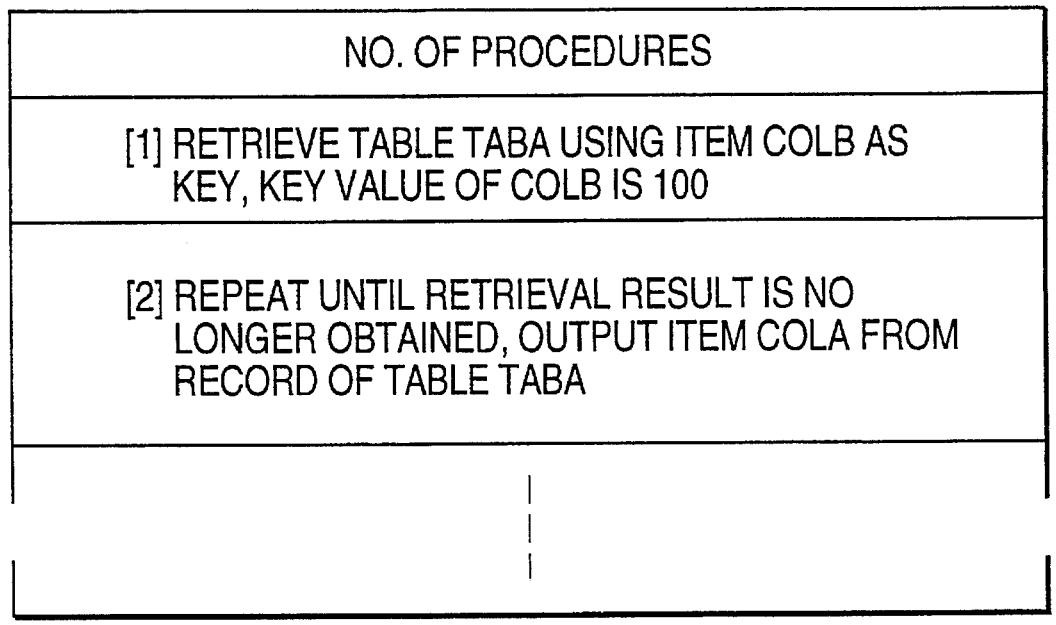

The "ORDER BY COLA" appearing last in the SQL statement cannot be executed by the database assist 31, and thus, the illustration thereof in the execution procedure table 22 is omitted in FIG. 4 (A). However, "ORDER BY COLA" is actually formed, and is executed by the execution control 23 (that is, a sorting process is executed in a step S11 shown in FIG. 3) based on the processed result which is returned from the database assist 31.

Figure 5:
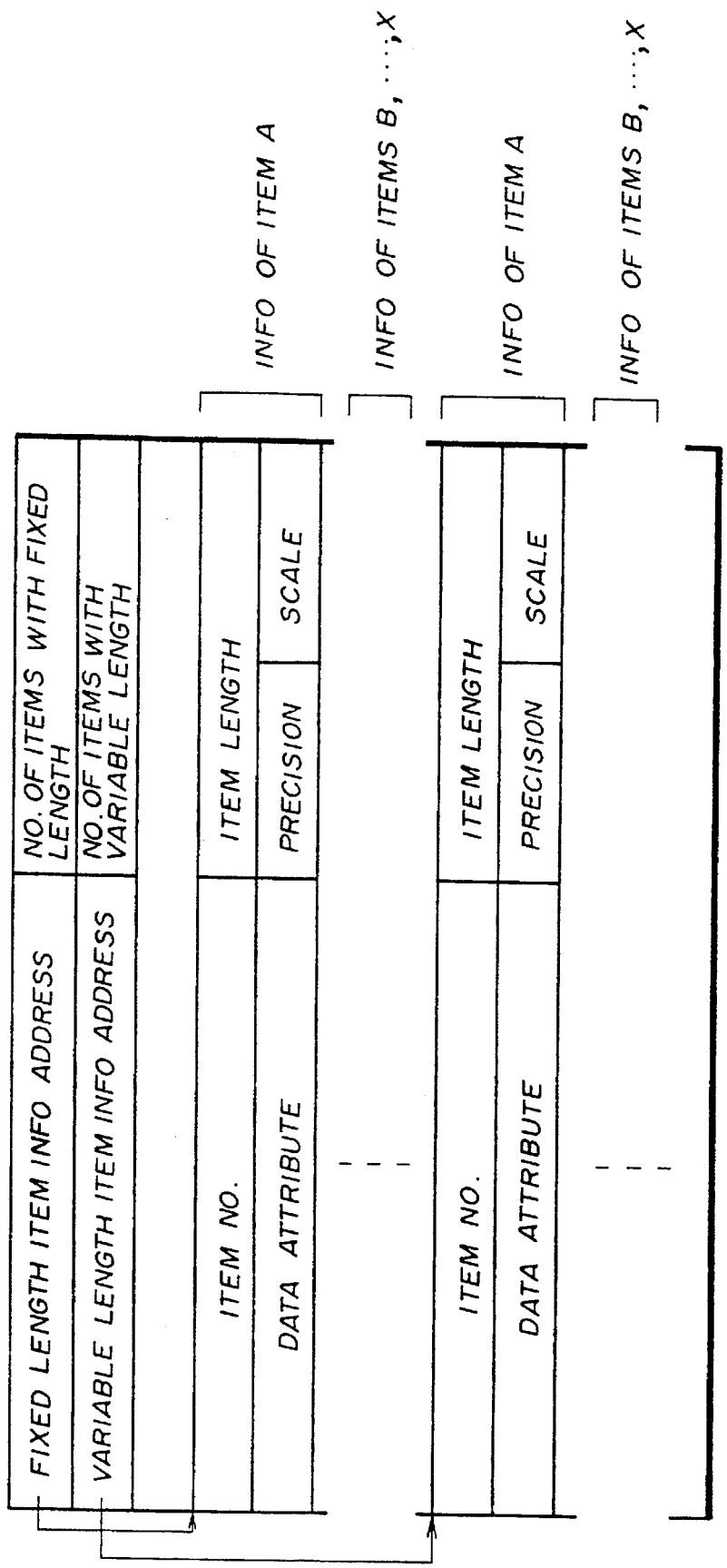
FIG. 5 shows an embodiment of a column information table.
Figure 6:
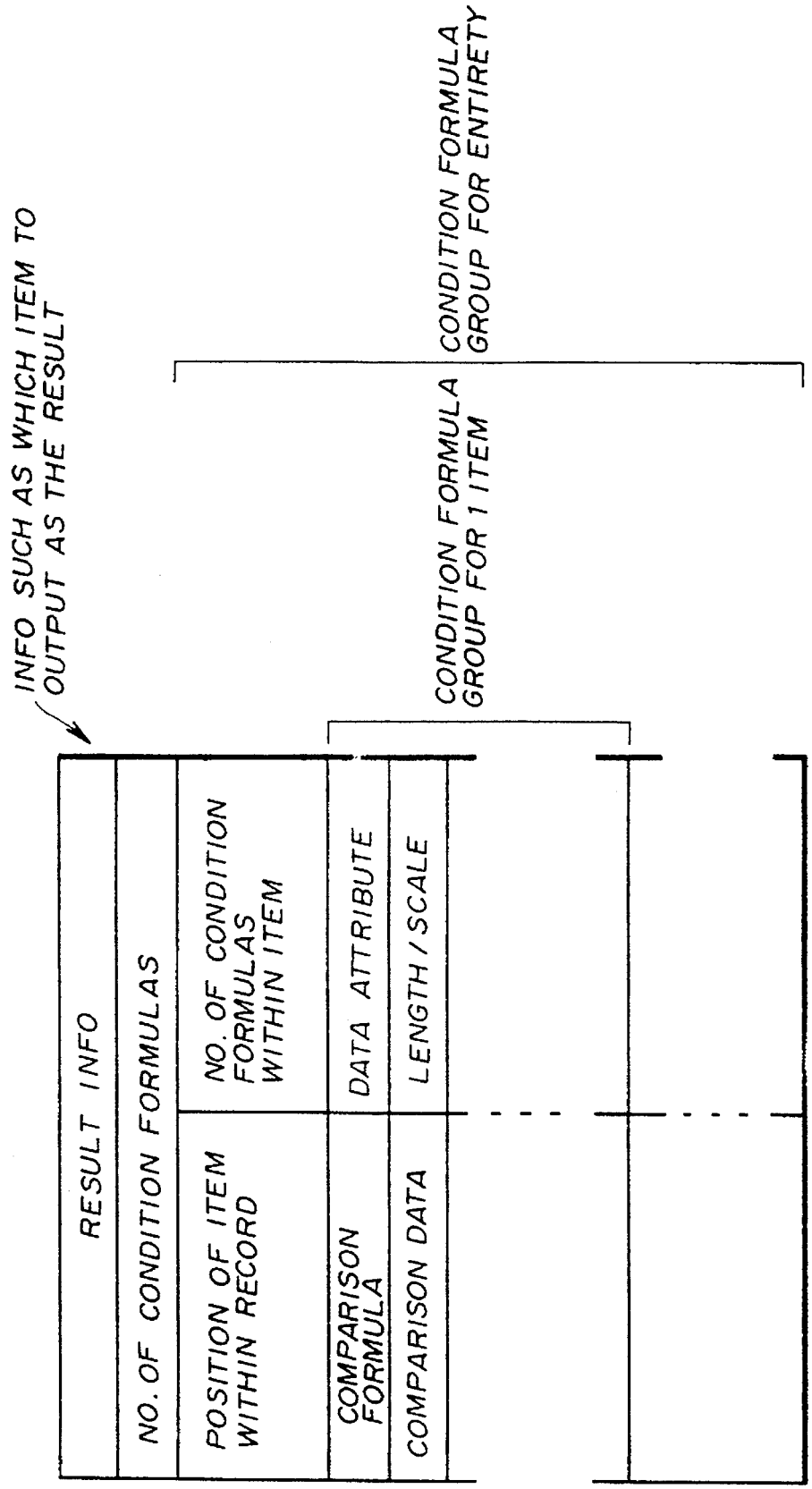
FIG. 6 shows an embodiment of a selection/projection information table.

The execution control 23 forms the column information table CIT and the selection/projection table SPT in a step S3 from the execution procedure table 22. In this embodiment, the execution control 23 forms the column information table CIT shown in FIG. 5 and the selection/projection table SPT shown in FIG. 6 based on the execution procedure table 22 shown in FIG. 4 (A).

The item structure within the record, such as the attribute of the item, the precision and scale, is set (or defined) in the column information table CIT. More particularly, the column information table CIT shown in FIG. 5 includes a fixed length item information address, and information related to the items A, B, . . . , and X in correspondence with the number of items having the fixed length. In addition, the column information table CIT shown in FIG. 5 includes a variable length item information address, and information related to the items A, B, . . . , and X in correspondence with the number of items having the variable length. For example, the information related to the item A includes the item number, the item length, the data attribute, the precision, the scale and the like. In other words, the fixed length item information address, only the number of items corresponding to the items having the fixed length, the variable length item information address, and only the number of items corresponding to the items having the variable length are set (or defined) in the column information table CIT.

On the other hand, the item to be extracted, the extracting conditions and the like are set (or defined) in the selection/projection table SPT. More particularly, selected ones of result information which includes information such as indicating the items to be output as the result, the number of condition formulas, the position of the item within the record, the number of condition formulas within the item, the comparison formula, the data attribute, the comparison data, the length/scale and the like are set (or defined) in the selection/projection table SPT shown in FIG. 6.

The execution control 23 instructs the record control 24 to make an access request to the database assist 31 in a step S4 using the column information table CIT and the selection/projection table SPT.

The record control issues a start input/output instruction START I/O in a step S5 in response to the access request made in the step S4, so as to transmit the column information table CIT and the selection/projection table SPT from the record control 24 to the database assist 31.

The database assist 31 obtains the column information table CIT and the selection/projection table SPT in a step S6 in response to the start input/output instruction START I/O which is issued in the step S5, and stores the block group which is obtained from the database 32 into a part of the disk cache memory 33 which is used as a memory.

The database assist 31 retrieves the record of interest in a step S7 based on the column information table CIT and the selection/projection table SPT, and makes the selection/projection with respect to an item of interest.

The database assist 31 decides whether or not the record from which the items of interest are obtained by the selection/projection has ended in a step S8. If the decision result in the step S8 is YES, the process instructed by the column information table CIT and the selection/projection table SPT has ended, and the database assist 31 returns the resulting item group to the execution control 23 via the record control 24. On the other hand, if the decision result in the step S8 is NO, the database assist 31 repeats the step S7 with respect to the next record.

The execution control 23 decides whether or not the processing of the entire table has ended in a step S10. If the decision result in the step S10 is YES, the execution control 23 processes the result in a step S11. More particularly, the step S11 carries out the sorting process which is instructed by the SQL statement "ORDER BY COLA". In other words, the step S11 sorts the items in the item group which are selected/projected from the database 32 and returned by the database assist 31 in an ascending order, and the result of the sorting process is transmitted to the application 1. On the other hand, if the decision result in the step S10 is NO, the execution control 23 repeats the steps S4 through S9 for the next volume.

The application 1 receives the transmitted result from the execution control 23 in a step S12.

Therefore, the optimizing process 21 forms the execution procedure table 22 based on the database selection/projection instruction and the sort instruction which are indicated by the application 1 in the SQL statement. The execution control 23 forms the column information table CIT and the selection/projection table SPT based on the execution procedure table 22. The database assist 31 stores the block group in the database 32 into the part of the disk cache memory 33 which is used as a memory, based on the column information table CIT and the selection/projection table SPT. The database assist 31 also makes the selection/projection of the item of interest, and returns the result to the execution control 23 by a batch processing. The execution control 23 processes the result from the database assist 31 if necessary, and the sorting process is carried out in this embodiment because the sorting process is instructed in the SQL statement. The result of the processing, that is, the result of the sorting process, is returned from the execution control 23 to the application 1.

Hence, the database assist 31 selects/projects the items of interest from the database 32 at a high speed without the use of the conventional index, and returns only the necessary data to the execution control 23 of the relational database manager 2 by a batch processing. For this reason, it is unnecessary to transfer the extremely large amount of records which are the subject of the retrieval from the database 32 which is stored in the disk unit 3 to the relational database manager 2, as was necessary according to the conventional technique. As a result, it is possible to greatly reduce the amount of data which must be transferred from the database 32 to the relational database manager 2.

Next, a description will be given of the selection/aggregate process of the first embodiment, by referring to the flow chart shown in FIG. 7.

Figure 7:
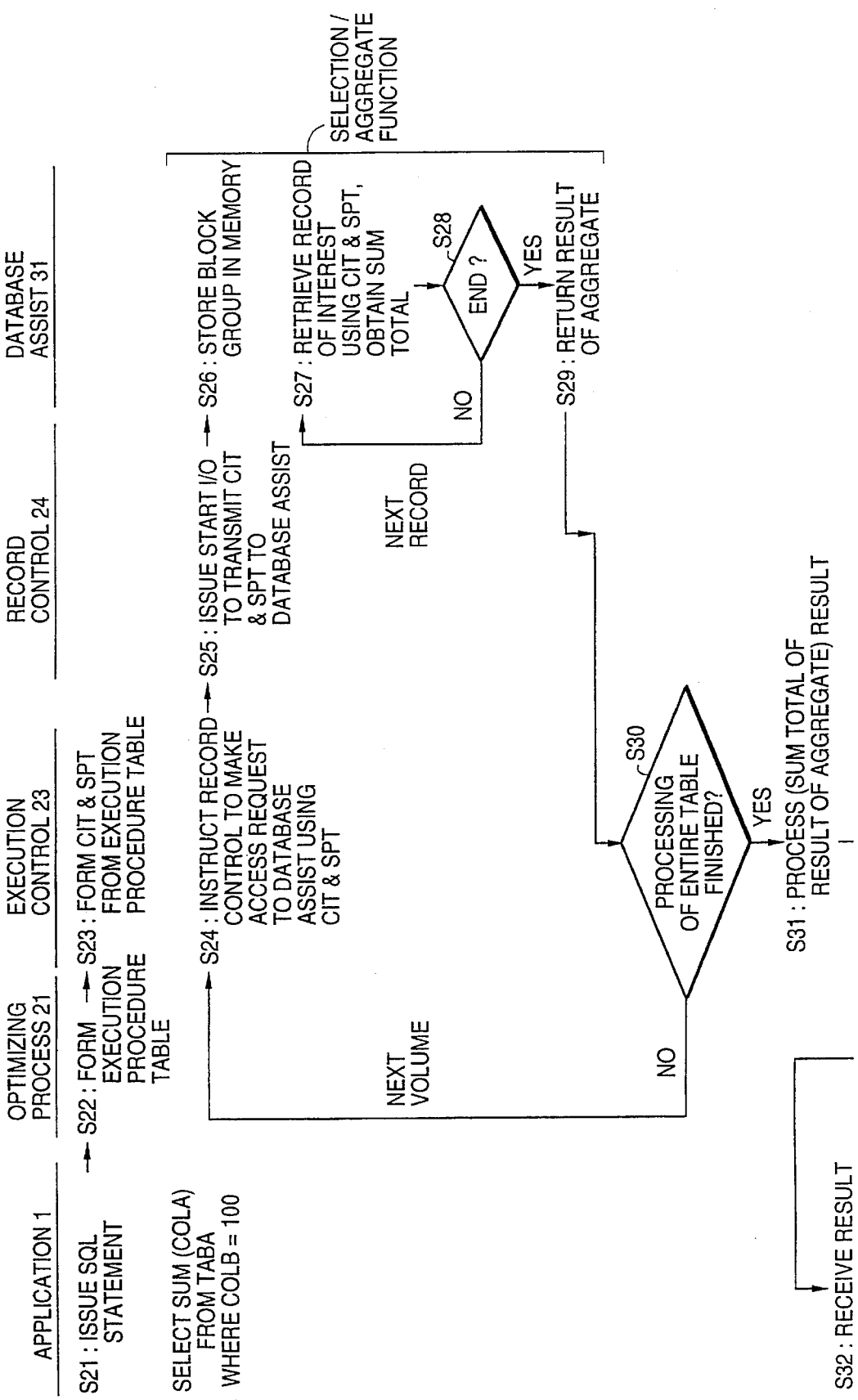
FIG. 7 is a flow chart for explaining a selection/aggregate process of the first embodiment.

In FIG. 7, the application 1 issues a SQL in a step S21, and requests selection/aggregate to the database 32. In this embodiment, the following SQL statement is issued to make the processing request to the relational database manager 2.

SELECT SUM (COLA) FROM TABA

WHERE COLB=100

In the SQL statement above, "SELECT SUM (COLA) FROM TABA" means "obtain the items COLA from the record of the table TABA, and obtain a sum total of the items COLA". "WHERE COLN=100" means "the key value of the item COLB is 100". Therefore, the records having the key value 100 is retrieved from the table TABA using the item COLB as the key, and the sum total of the items COLA is obtained from the retrieved records.

The optimizing process 21 forms the execution procedure table in a step S22 based on the SQL statement. In this embodiment, the step S22 analyzes the SQL statement, and forms the execution procedure table 22 shown in FIG. 4 (B). In this case, [1] the table TABA is retrieved using the item COLB as the key, and the key value of the item COLB is 100. In addition, [2] the retrieval is repeated until the retrieval result is no longer obtained, and the items COLA are obtained from the record of the table TABA and a sum total of the items COLA is obtained.

The execution control 23 forms the column information table CIT and the selection/projection table SPT in a step S23 based on the execution procedure table. More particularly, the step S23 forms the column information table CIT shown in FIG. 5 and the selection/projection table SPT shown in FIG. 6 based on the execution procedure table 22 shown in FIG. 4 (B). The column information table CIT defines the item structure within the record, such as the attribute of the item, precision, scale and the like. On the other hand, the selection/projection table SPT defines the item to be extracted, the extracting conditions and the like.

The execution control 23 instructs the record control 24 to make an access request to the database assist 31 in a step S24, based on the column information table CIT and the selection/projection table SPT.

The record control 24 issues a start input/output instruction START I/O in a step S25 in response to the access request made in the step S24, in order to transmit the column information table CIT and the selection/projection table SPT from the record control 24 to the database assist 31.

The database assist 31 obtains the column information table CIT and the selection/projection table SPT in a step S26 in response to the start input/output instruction START I/O which is issued in the step S25, and stores the block group which is obtained from the database 32 into a part of the disk cache memory 33 which is used as a memory.

The database assist 31 retrieves the record of interest in a step S27 based on the column information table CIT and the selection/projection table SPT, and obtains a sum total of the items of interest by retrieving the items of interest.

The database assist 31 decides whether or not the record from which the items of interest are retrieved and the sum total thereof obtained has ended in a step S28. If the decision result in the step S28 is YES, the process instructed by the column information table CIT and the selection/projection table SPT has ended, and the database assist 31 returns the result of the aggregate to the execution control 23 via the record control 24. On the other hand, if the decision result in the step S28 is NO, the database assist 31 repeats the step S27 with respect to the next record.

The execution control 23 decides whether or not the processing of the entire table has ended in a step S30. If the decision result in the step S30 is YES, the execution control 23 processes the result in a step S31. More particularly, the step S31 obtains a sum total of the aggregate which is instructed by the SQL statement, and the sum total of the result of the aggregate is transmitted to the application 1. On the other hand, if the decision result in the step S30 is NO, the execution control 23 repeats the steps S24 through S29 for the next volume.

The application 1 receives the transmitted result from the execution control 23 in a step S32.

Therefore, the optimizing process 21 forms the execution procedure table 22 based on the database selection/aggregate instruction which is indicated by the application 1 in the SQL statement. The execution control 23 forms the column information table CIT and the selection/projection table SPT based on the execution procedure table 22. The database assist 31 stores the block group in the database 32 into the part of the disk cache memory 33 which is used as a memory, based on the column information table CIT and the selection/projection table SPT. The database assist 31 also retrieves the items of interest and obtains the sum total thereof, and returns the sum total of the result of the aggregate to the execution control 23 by a batch processing. The execution control 23 processes the result from the database assist 31 if necessary, and the sum total of the results of the aggregate is obtained in this embodiment because this is instructed in the SQL statement. The result of the processing, that is, the sum total of the results of the aggregate, is returned from the execution control 23 to the application 1.

Hence, the database assist 31 retrieves the items of interest from the database 32 at a high speed without the use of the conventional index, obtains the sum total of the retrieved items, and returns the sum total of the results of the aggregate to the execution control 23 of the relational database manager 2 by a batch processing. For this reason, it is unnecessary to transfer the extremely large amount of records which are the subject of the retrieval from the database 32 which is stored in the disk unit 3 to the relational database manager 2, as was necessary according to the conventional technique. As a result, it is possible to greatly reduce the amount of data which must be transferred from the database 32 to the relational database manager 2.

FIG. 8 shows an embodiment of the aggregate of the database assist 31. The aggregate shown in FIG. 8 can be executed by the database assist 31 shown in FIG. 2. The number of records to be subjected to the aggregate is returned to the database assist 31, and thus, the number of records is set to this returned number of records. The total of the values of the items excluding the NULL value and the number of cases are returned to the database assist 31 for each item. Hence, the total of the item values and the number of cases of the item values can be calculated from these returned information.

The aggregate of the database assist 31 is carried out in page groups. Hence in the step S11 shown in FIG. 3 and in the step S31 shown in FIG. 7, the execution control 23 must obtain the aggregate of the results of the page groups based on the results of the aggregate returned from the database assist 31.

FIG. 9 shows an embodiment of the utilization range of the database assist 31 and the reaggregate of the returned information. In FIG. 9, the set function includes the sum SUM, average AVG, maximum MAX, minimum MIN, items COUNT and COUNT(*). The column of the database assist function indicates the existence of the set function. The content of the reaggregate indicates the operation which is to be made when making the reaggregate. For example, the set function average AVG is calculated by obtaining the total of the item values from the database assist 31 and obtaining the average value from the total number of the cases.

FIG. 10 shows an embodiment of the condition formula which carries out a process by the database assist 31. The condition formula shown in FIG. 10 can be processed in the database assist 31.

In FIG. 10, an item operator constant is a comparison predicate, and is "item B=100", for example. The LIKE predicate is a partial match of characters, for example. The IN predicate is "item B IN (100, 200, 300)", for example.

Accordingly, out of the conditions instructed in the SQL statement, the condition formula which can be processed in the database assist 31 is converted into the selection/projection table SPT and executed. The condition formula which cannot be processed in the database assist 31 is evaluated in the execution control 23 of the relational database manager 2 with respect to the record which is extracted by the database assist 31.

Figure 11:
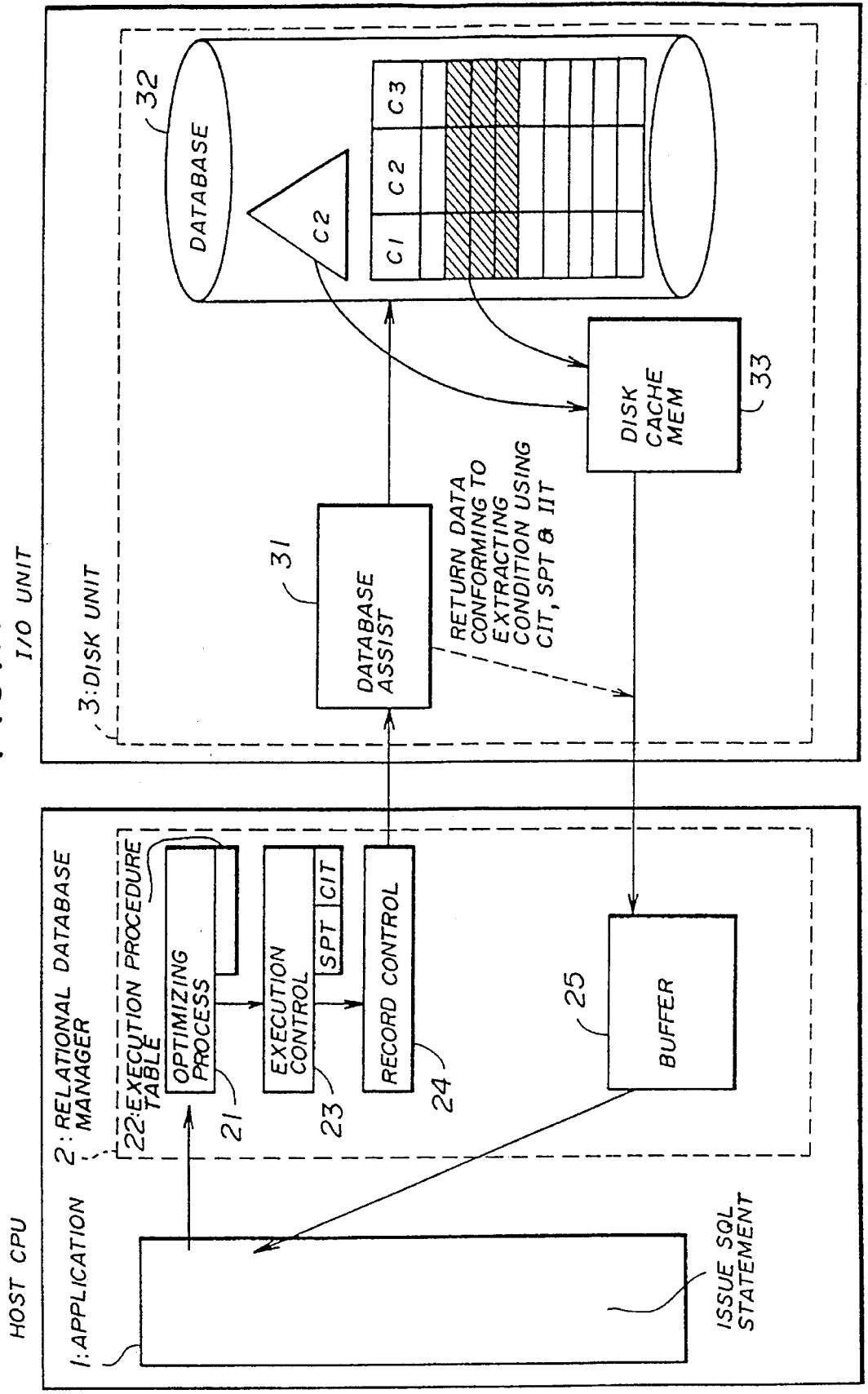
FIG. 11 is a system block diagram for explaining a second embodiment of the database assist method according to the present invention.

Next, a description will be given of a second embodiment of the database assist method according to the present invention, by referring to FIG. 11. This embodiment additionally utilizes the index which is conventionally used. In FIG. 11, those parts which are the same as those corresponding parts in FIG. 2 are designated by the same reference numerals, and a description thereof will be omitted.

The relational database manager 2 can also make a reference to the index, similarly to the conventional technique, based on the execution procedure table, so as to successively enter the record of interest from the database 32. In this case, it is possible to subject only the specified item to the selection, projection and aggregate, and to return the processed result to the application 1. If an access specifying the use of the conventional index is made in the execution procedure table 22, the execution control 23 requests a record access using the index with respect to the record control 24. The record control 24 makes an access to the database 32 using the index, and returns the read record to the execution control 23.

In other words, the execution control 23 in this embodiment forms an index information table IIT based on the execution procedure table 22, in addition to the column information table CIT and the selection/projection table SPT. The index information table IIT includes physical information which forms the indexes, and logical information which indicates the column to which each index is related. Hence, the execution control 23 transmits this index information table IIT to the database assist 31 together with the column information table CIT and the selection/projection table SPT.

The database assist 31 reads the indexes according to the index information table IIT, and determines the block group in which the record or interest is stored. The selection, projection or aggregate is carried out with respect to this block group based on the column information table CIT and the selection/projection table SPT.

Figure 12:
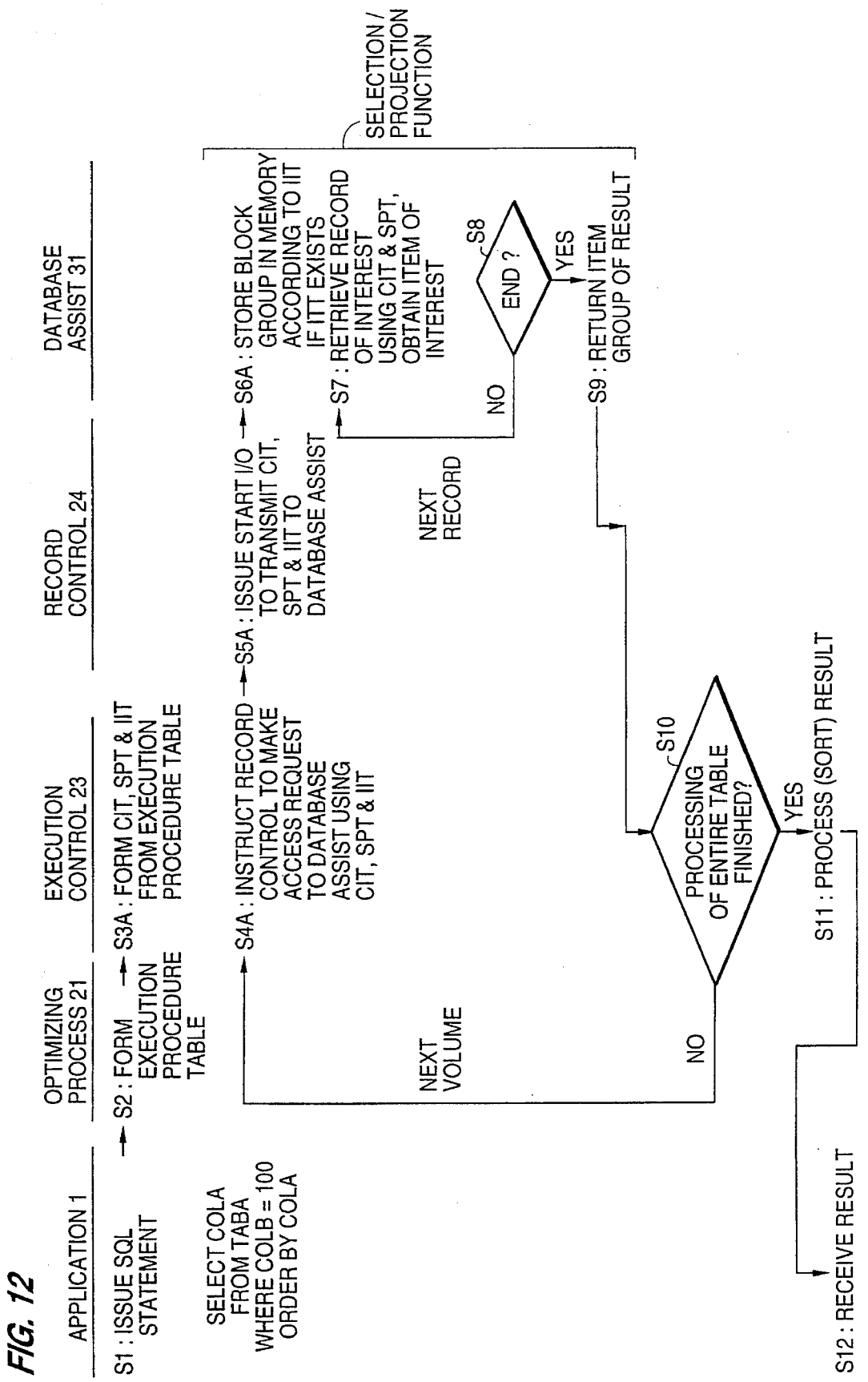
FIG. 12 is a flow chart for explaining selection/projection of a database in the second embodiment.

Next, a more detailed description will be given of the operation of this embodiment, by first referring to FIG. 12 which shows the selection/projection of the database 32. In FIG. 12, those steps which are the same as those corresponding steps in FIG. 3 are designated by the same reference numerals, and a description thereof will be omitted.

In FIG. 12, the steps S1 and S2 are the same as those shown in FIG. 3. The execution control 23 forms the column information table CIT, the selection/projection table SPT and the index information table IIT in a step S3A from the execution procedure table 22.

The execution control 23 instructs the record control 24 to make an access request to the database assist 31 in a step S4A using the column information table CIT, the selection/projection table SPT and the index information table IIT.

The record control issues a start input/output instruction START I/O in a step S5A in response to the access request made in the step S4A, so as to transmit the column information table CIT, the selection/projection table SPT and the index information table IIT from the record control 24 to the database assist 31.

The database assist 31 obtains the column information table CIT, the selection/projection table SPT and the index information table IIT in a step S6A in response to the start input/output instruction START I/O which is issued in the step S5A, and stores the block group of interest which is obtained from the database 32 based on the index information table IIT into a part of the disk cache memory 33 which is used as a memory if the index information table IIT exists.

Thereafter, the steps S7 through S12 are carried out similarly to the first embodiment.

Figure 13:
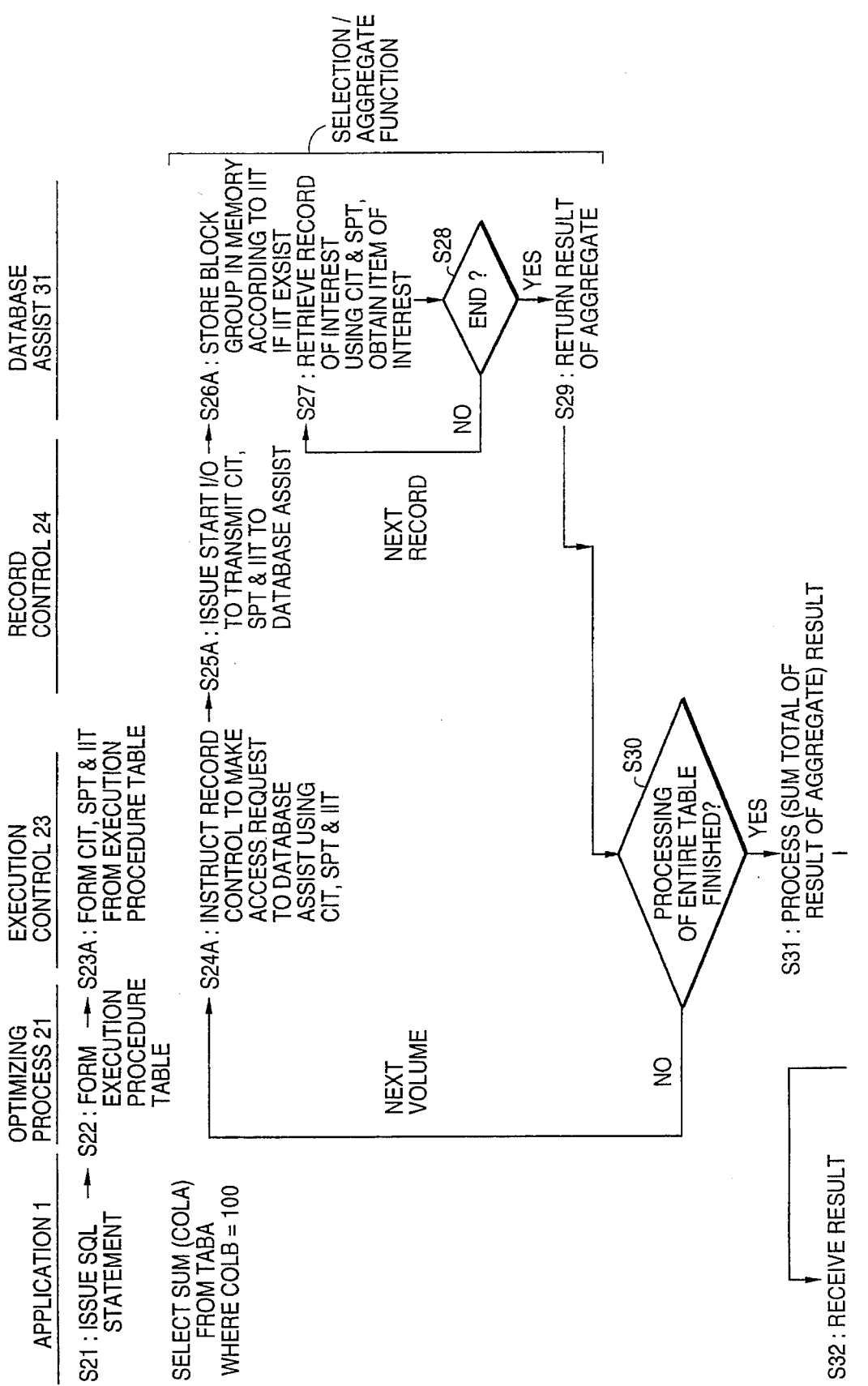
FIG. 13 is a flow chart for explaining a selection/aggregate process of the second embodiment.

Next, a description will be given of the selection/aggregate process, by referring to the flow chart shown in FIG. 13. In FIG. 13, those steps which are the same as those corresponding steps in FIG. 7 are designated by the same reference numerals, and a description thereof will be omitted.

In FIG. 13, the steps S11 and S12 are the same as those shown in FIG. 7. The execution control 23 forms the column information table CIT, the selection/projection table SPT and the index information table IIT in a step S23A based on the execution procedure table 22.

The execution control 23 instructs the record control 24 to make an access request to the database assist 31 in a step S24A, based on the column information table CIT, the selection/projection table SPT and the index information table IIT.

The record control 24 issues a start input/output instruction START I/O in a step S25A in response to the access request made in the step S24A, in order to transmit the column information table CIT, the selection/projection table SPT and the index information table IIT from the record control 24 to the database assist 31.

The database assist 31 obtains the column information table CIT, the selection/projection table SPT and the index information table IIT in a step S26A in response to the start input/output instruction START I/O which is issued in the step S25A, and stores the block group which is obtained from the database 32 based on the index information table IIT into a part of the disk cache memory 33 which is used as a memory if the index information table IIT exists.

Thereafter, the steps S27 through S32 are carried out similarly to the first embodiment.

The specified process carried out by the database assist 31 is of course not limited to those of the described embodiments, and the specified process may arbitrarily be selected from a group including selection, projection, join, aggregate, grouping and sorting.

Further, the present invention is not limited to these embodiments, but various variations and modifications may be made without departing from the scope of the present invention.

What is claimed is:

1. A database assist method adapted to a data processing system which includes a first progressing unit and an input/output unit which is coupled to the first processing unit and includes a second processing unit, a database and cache memory, said database assist method assisting a database related process which includes selection of items from records stored in the database and comprising the steps of:

(a) forming an execution procedure table which defines a procedure for retrieving information of interest from the database in response to a processing request from a request source;

(b) generating a column information table and a selection/projection table based on the execution procedure table, said column information table includes item structures within the records, said selection/projection table including the items to be extracted and extracting conditions;

(c) storing a block group of interest into cache memory from the database based on the column information table and the selection/projection table and carrying out a specified process in response to the processing request with respect to the stored block group for a specified item; and (d) returning a result of the specified process carried out in said step (c) to the request source by a batch processing.

2. The database assist method as claimed in claim 1, wherein the input/output unit forms a disk unit which stores the database in a disk storage, and the cache memory means is made up of a disk cache memory.

3. The database assist method as claimed in claim 1, wherein said step (c) carries out the specified process which is selected from a group consisting of selection, projection, join, aggregate, grouping and sorting.

4. The database assist method as claimed in claim 1, which further comprises the step of:

(e) subjecting the result of the specified process carried out in said step (c) to another process specified by the request source before returning the result to the request source.

5. The database assist method as claimed in claim 4, wherein said step (e) carries out said another process which is selected from a group consisting of sorting and calculation of a sum total of results of aggregate.

6. The database assist method as claimed in claim 4, wherein said steps (a) and (b) are carried out by the first processing unit, and said steps (c) and (d) are carried out by the second processing unit.

7. The database assist method as claimed in claim 6, wherein said step (e) is carried out by the first processing unit.

8. The database assist method as claimed in claim 1, wherein said steps (a) and (b) are carried out by the first processing unit, and said steps (c) and (d) are carried out by the second processing unit.

9. The database assist method as claimed in claim 1, wherein said steps (c) and (d) are carried out by the second processing unit which forms a database assist, and said database assist method further comprises the step of:

(e) automatically entering the record of interest from the database into the cache memory in accordance with the execution procedure table and continuing the database related process if the database assist is unavailable.

10. The database assist method as claimed in claim 1, wherein said step (b) further generates an index information table based on the execution procedure table, said index information table including physical information which forms indexes and logical information which indicates a column to which each index is related, and said step (c) stores the block group of interest into cache memory means from the database based on the index information table if the index information table exists.

* * * * *